United States Patent [19]

Larigaldie et al.

[11] Patent Number: 4,864,459
[45] Date of Patent: Sep. 5, 1989

[54] LAMINAR FLOW HOOD WITH STATIC ELECTRICITY ELIMINATOR

[75] Inventors: Serge Larigaldie, Chatenay-Malabry; Joseph Taillet, Boulogne, both of France

[73] Assignee: Office National D'Etudes Et De Recherches Aerospatiales, France

[21] Appl. No.: 103,285

[22] Filed: Oct. 1, 1987

[30] Foreign Application Priority Data

Oct. 8, 1986 [FR] France .................. 86 14023

[51] Int. Cl.$^4$ .................................... H05F 3/00
[52] U.S. Cl. ........................ 361/216; 361/231; 361/235
[58] Field of Search .............. 361/212, 214–216, 361/220, 222, 230, 231, 235; 250/324

[56] References Cited

U.S. PATENT DOCUMENTS

| | | | |
|---|---|---|---|
| 2,709,954 | 6/1955 | Baker | 361/231 |
| 2,879,395 | 3/1959 | Walkup | 361/235 |
| 3,237,068 | 2/1966 | Sowiak | 361/235 |
| 3,585,448 | 6/1971 | Simons | 361/230 |
| 3,714,531 | 1/1973 | Takahashi | 361/235 |
| 3,862,826 | 1/1975 | Haupt | 361/226 |
| 3,942,072 | 3/1976 | Best et al. | 361/235 |
| 4,027,201 | 5/1977 | Bacon et al. | 361/213 |
| 4,092,543 | 5/1978 | Levy | 250/324 |
| 4,188,530 | 2/1980 | Miller | 361/213 |
| 4,216,518 | 8/1980 | Simons | 361/213 |
| 4,271,451 | 6/1981 | Metz | 361/235 |
| 4,423,462 | 12/1983 | Antonevich | 361/230 |
| 4,435,195 | 3/1984 | Testone | 361/235 |
| 4,477,263 | 10/1984 | Shaver et al. | 361/235 |
| 4,485,428 | 11/1984 | Harris | 361/235 |

FOREIGN PATENT DOCUMENTS

| | | | |
|---|---|---|---|
| 2639706 | 4/1977 | Fed. Rep. of Germany . | |
| 2483259 | 4/1981 | France | 361/230 |
| 2497826 | 7/1982 | France . | |
| 2506086 | 11/1982 | France | 361/230 |
| 2045647 | 11/1980 | United Kingdom . | |

Primary Examiner—L. T. Hix
Assistant Examiner—David M. Gray
Attorney, Agent, or Firm—Stevens, Davis, Miller & Mosher

[57] ABSTRACT

A frame is placed in the flow of incident air from a laminar flow hood, and bare wires and insulated wires are stretched over the frame. A source including a transformer produces an alternating voltage. One of the outputs thereof is directly connected to the insulating wires and the other output thereof is connected to the bare wires via a capacitor. An electrode placed inside the volume of the cabinet fed with air from the hood is connected to a DC amplifier which applies a correcting voltage to the insulated wires. This apparatus turns out to be highly effective, in particular, for removing dust and neutralizing charge when manufacturing VLSI circuits.

18 Claims, 9 Drawing Sheets

LAMINAR FLOW HOOD WITH STATIC ELECTRICITY ELIMINATOR

The invention, which relates to installations for performing processing under controlled atmosphere, is most particularly applicable to devices known as "laminar flow hoods" or equivalent devices.

BACKGROUND OF THE INVENTION

Laminar flow hoods are used, in particular in the electronics industry, when manufacturing wafers for very large scale integration (VLSI) circuits.

Such wafers are manufactured in a sequence of accurately determined operations of the photo-etching type, to form a complex repetitive pattern on the wafer. At the end of manufacture, the wafer is cut up in order to obtain as many integrated circuits as there are patterns on the wafer. Clearly a fault in the pattern of any of the integrated circuits obtained in this way makes that circuit unusable, and it is obviously advantageous to reduce the number of such defects in order to increase production yield.

It should be pointed out that the etched wafers comprise different kinds of circuit at different stages of manufacture. During a first stage, they comprise useful circuit devices which are not yet interconnected, while during a second stage they comprise devices which are interconnected to form genuine circuits which are sensitive to any electrical signals that may be applied thereto.

Laminar flow hoods are used firstly in order to protect the items being handled from the effect of dust: even very small quantities of dust can reduce production yield to a very great extent. Any circuit element having a particle of dust adhering thereto is unusable.

In order to prevent the air surrounding the wafer from bringing in dust, the feed air is filtered and the flow of this air is directed so that no polluted air returns towards the wafer from the floor environment or from the operators. Thus, a wafer placed on the working surface beneath a hood should be immersed solely in a laminar flow of filtered air. It is essential that the flow be laminar in order to avoid any turbulence in the air which could sweep in dust towards the working surface.

However, the problem is complicated by the fact that under the working conditions required in the VLSI electronic circuit industry, it is also necessary to use air having low humidity. Under such conditions, the various physical mechanisms capable of generating and accumulating static electricity on insulating surfaces become highly effective. In particular, the surface of the semiconductor wafers may take on a high electric charge. Such an electric charge sets up an electric field which attracts those rare particles of dust that remain in the laminar flow, in spite of the filtering performed at the inlet to the hood. This gives rise to the above-mentioned drawbacks relating to the manufacturing yield of VLSI circuits.

Further, once the wafers already have circuits on them, the appearance of electrostatic charge on the wafers can give rise to micro discharges which may destroy various semi-conductor devices.

Briefly, static electricity reduces the production yield of VLSI circuits for two reasons:
 (a) prior to the circuits being interconnected, it increases dust pollution; and
 (b) once they have been interconnected, it destroys circuits by electrostatic discharge.

In order to improve production yield, it is therefore essential to get rid of the electric charge generated in a laminar flow hood by neutralizing it.

Two types of static electricity eliminator are suitable for being used in laminar flow hoods in general for solving this problem.

Firstly, radioactive eliminators may be used, comprising a pellet that emits alpha rays, for example. Such rays ionize air over a distance of a few centimeters from the pellet. By raising the pellet to a positive potential, for example, the negative ions produced are collected by the pellet and the remaining positive ions are available for neutralizing negative charge in the immediate environment of the pellet. By blowing on the ionized zone, a flow of air can be set up to convey ions towards the zones where charge is to be neutralized.

Such neutralizers have a low maximum discharge current (a few tens of pico-amps) and operate over a short distance (a few centimeters). They are therefore not very effective and they also suffer from the drawbacks related to the presence of a radioactive substance. As a result they are not usually employed in industrial laminar flow hoods.

In practice, industrial hoods employ static electricity eliminators using a corona discharge.

For fitting to laminar flow hoods, units comprising a grid of electrodes are used, with the electrodes generally being in the form of points facing bars and fed with alternating voltages, the entire assembly being associated with a fan setting up a flow of air through the grid, thereby entraining ions towards the surfaces to be neutralized. Such neutralizers include one made by the American company Techni-Tool, the Dynastat made by the American company CRP, or the Aerostat (registered trademark) made by the American company Simco. Such apparatuses, or components therefor, are also described in the following U.S. Pat. Nos.: 3,585,448, 4,092,543, 4,188,530, 4,216,518, and 4,423,462.

Their general principle is that during one full cycle of the feed voltage these units successively produce ions of both polarities. During the neutralization process, only the ions of one polarity are used and the others are eliminated by grounding.

Unlike radioactive devices, appropriately disposed eliminators based on corona discharge are capable of providing charge-neutralizing currents at several microamps suitable for neutralizing charged surfaces in a few tens of seconds and at a distance of greater than one meter. They need to satisfy the following conditions:
 provide strictly identical flows of positive ions and of negative ions in order to avoid progressively raising insulating surfaces or insulated conductors in the ionized flow to a high potential;
 avoid producing aerodynamic turbulence or any deformation in the laminar flow of the hood;
 avoid introducing water vapor, ozone pollution or pollution from microscopic particles, e.g. particles torn from the high voltage points under the effect of the electric field;
 avoid electrically charging the few remaining dust particles in the laminar flow; and
 avoid any danger of electrocuting personnel.

In the techniques currently in use, a sufficient ion density is generally obtained in the hood by using a flow of air coming from an auxiliary fan.

The positive and negative ion currents are equalized by adjusting the waveform of the alternating feed voltage, and examples are described in above-mentioned U.S. Pat. Nos. 2,879,395, 3,714,531, 4,092,543, and 4,423,462. Equal amplitude positive and negative voltage half-cycles do not provide equal positive and negative ion currents because positive and negative corona discharges do not have the same current/voltage characteristics.

It is difficult to avoid turbulence when using commercially available blowers. Strictly speaking, turbulence is satisfactory only with a purely static apparatus.

As to the problem of impurities, the water vapor question is generally solved by the air conditioning system of the hood. However, corona discharges do give off small quantities of ozone, and these are acceptable in principle provided that the alternating feed voltage does not exceed a critical threshold which is slightly greater than the breakdown threshold of the corona discharge.

In addition, the quantity of particles torn from the point-shaped parts of the device must be limited, i.e. erosion of the bare members of the electrostatic charge eliminator must be limited.

Thus, in addition to irremediably damaging the equipment and degrading its operation, arcing also produces erosion and consequently the emission of vapors and particles which poison the atmosphere in the hood. It is thus highly desirable to use a system which is designed so as to be incapable of arcing.

Finally, avoiding any danger of electrocution has been particularly closely studied by Simco, as described in U.S. Pat. Nos. 3,585,448 and 4,216,518.

However, in general, none of the devices known so far gives complete satisfaction.

In French Pat. No. 80 11945 (published under the number 2,483,259) and in the certificate of addition thereto number 81 09646 (published under the number 2,506,086), the present Applicant describes a particularly effective device for eliminating electrostatic charge, however it makes use of an auxiliary supersonic flow which is manifestly incompatible with the operating characteristics of a laminar flow hood.

It now appears that the problems encountered in practice with laminar flow hoods can be solved by using a new electrostatic charge eliminator which, in addition, avoids the drawbacks related to the auxiliary flow used by the Applicant's prior devices.

SUMMARY OF THE INVENTION

The invention is applicable to an assembly of the laminar flow hood type comprising a cabinet defining a work surface in a compartment which is accessible from one side and which is provided in a top portion thereof with hood means for producing a laminar flow of filtered gas directed towards the work surface so that materials placed on the work surface are protected from the influence of the ambient atmosphere.

According to the invention, a static electricity eliminator device is interposed in the gas flow inlet in the top of the cabinet, said device comprising:
a rigid frame which is insulating or which includes insulators for supporting wires;
a first set of parallel conductive wires which are coplanar, equidistant and stretched over the rigid frame;
a second set of parallel conductive wires which are coplanar, equidistant and stretched over the rigid frame, and each of which is at substantially equal distances between two wires of the first set;
high tension insulating means between the wires of the first set and the wires of the second set; and
an alternating high tension power supply, in particular having an output transformer whose output terminals are connected respectively to feed the wires of the first set and the wires of the second set;
said high tension being selected to generate an alternating corona discharge in each gap between the wires of the second set, thereby producing flows of charges of both polarities which accompany the laminar flow and serve to eliminate static electricity inside the cabinet.

Advantageously, the alternating high tension has a peak amplitude lying between 4 kilovolts and 10 kilovolts and a frequency lying between 50 Hz and 1000 Hz.

At least in some applications, it is advantageous for the alternating high tension to have a waveform which, in each half cycle, comprises an initial high value pulse followed by a low value step for the remainder of the half cycle. This may be achieved by the high tension source being provided by a saturated iron transformer.

The insulating means advantageously comprise insulating sheaths around the wires of the second set along their portions stretched across the frame. In a variant, the insulating means may be a series of insulating blades interposed between each wire of the first set and the adjacent wires of the second set.

The portions of the wires of the first set which are stretched over the frame may include short and mutually parallel transverse wires or spikes forming points on each side of the main wire in such a manner as to localize discharging.

In a variant the wires of the first set have longitudinally extending sharp edges on them of the type used in industrial precipitators.

In one embodiment of the invention, the device further includes a differential voltage amplifier having high input impedance and passing DC, with a first input thereof being connected to a potential sensor situated inside the assembly, and with the other input thereof being connected to ground. The output from the amplifier provides a DC correction voltage which is superposed on the alternating high tension power supply, either by means of a series circuit or else by means of a parallel circuit.

In different variants:
the output from the amplifier is directly connected in series with the AC source;
the output from the amplifier controls the cursor of a DC voltage divider;
the output from the amplifier is connected via a resistance to the set of insulated wires, and the set of insulated wires is separated from the AC feed by a capacitor.

Similarly, the potential sensor may be constituted by:
the wires of the first set themselves;
an auxiliary electrode placed in the working plane of the hood, with the wires of the first set being connected to ground; or else
an auxiliary rigid frame having a conductive grid, as described below.

Finally, according to another aspect of the invention, it is advantageous for a second frame to be provided in the immediate downstream vicinity of the static electricity eliminator device, with a very wide mesh grid being stretched over said second frame to constitute an equipotential plane, which is preferably connected to ground.

BRIEF DESCRIPTION OF THE DRAWINGS

Embodiments of the invention are described by way of example, with reference to the accompanying drawings, in which.

The accompanying drawings include, for the most part, information which is definitive in nature. Consequently, these drawings are incorporated in the description not only for the purpose of clarifying it, but also for contributing to the definition of the invention, where appropriate.

MORE DETAILED DESCRIPTION

Figure 1:
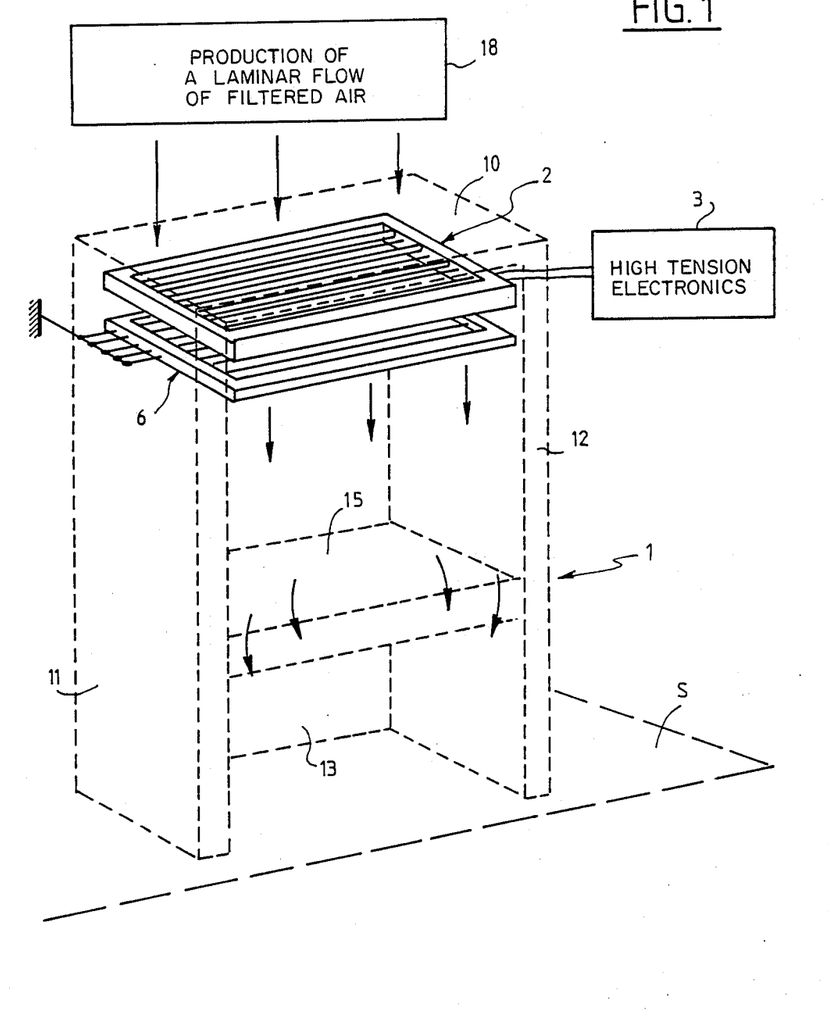
FIG. 1 is a diagram of a laminar flow hood, and more precisely of the means incorporated therein in accordance with the invention.

In FIG. 1, the laminar flow hood and associated cabinet is given an overall reference 1.

The cabinet comprises two side walls 11 and 12, a rear wall 13, and is covered by a ceiling 10. Substantially halfway up the cabinet there is a work surface 15.

Block 18 represents hood means for producing a laminar flow of filtered air which enters into the cabinet through its ceiling 10 and moves down towards the work surface 15. The invention provides for the addition of an electrostatic electricity eliminator device and its associated high-tension electronics 3 being added to the hood. Where appropriate, an additional device 6 is also provided, but it should be observed that this device is not required for obtaining the basic advantages of the invention.

The hood and cabinet assembly stands on a floor S which is electrically grounded as are the conducting portions of the assembly.

The static electricity eliminator device 2 has the same structure in all of FIGS. 2A to 3C. It is therefore described once only.

It comprises a rigid frame 20 having stretched thereover:
a first set of wires 21-1 to 21-n which are interconnected at 23 (in theory outside the frame 20); and
a second set of wires 22-1 to 22-n which are interconnected at 24.

As mentioned above, the wires in the two sets are parallel, coplanar, extend taut over the rigid frame, and are equidistant not only within each set but also between the two sets. If the frame is insulating, the wires are stretched over it directly, otherwise if the frame is conductive they are supported by insulators which are fixed to the frame.

High tension insulation is provided between the wires. Although this can be done by means of blades interposed between the wires of the two sets, it is preferred for the insulation to be provided by means of insulating sheaths placed over the wires 22-1 to 22-n.

The connection 23 common to all the wires of the first set is connected to a terminal 25. The connection 24 common to all the wires of the second set is connected to a terminal 26. These two terminals are connected to the electronics 3 which, as already mentioned, produces an alternating high tension with a peak amplitude lying between 4 kvolts and 10 kvolts, at a frequency lying between about 50 Hz and 1000 Hz.

The electronics 3 comprises a power supply 30 which may be electricity mains if a frequency of 50 Hz is being used or else a frequency converter for conversion to an appropriate frequency. The output from the power supply 30 is applied to the primary winding 31 of a transformer 32. One terminal of the primary winding 31 may be grounded.

The secondary winding 33 of the transformer has terminals 35 and 36. The terminal 35 is connected to the terminal 25 either via a capacitor 38 (of FIGS. 2A, 2B, 2C; 3A, 3B) or else directly (of FIG. 3C).

Figure 2A:
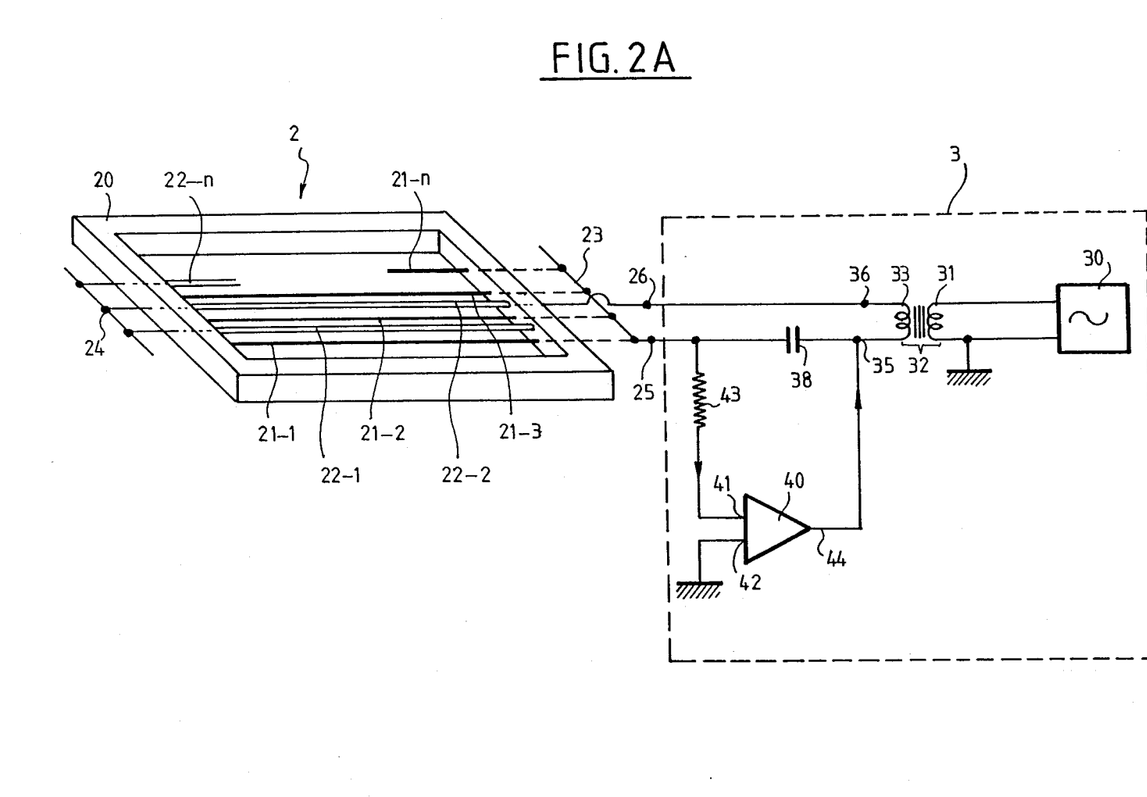
FIG. 2A shows a first embodiment of the invention in which the potential sensor is constituted by some of the wires.
Figure 2B:
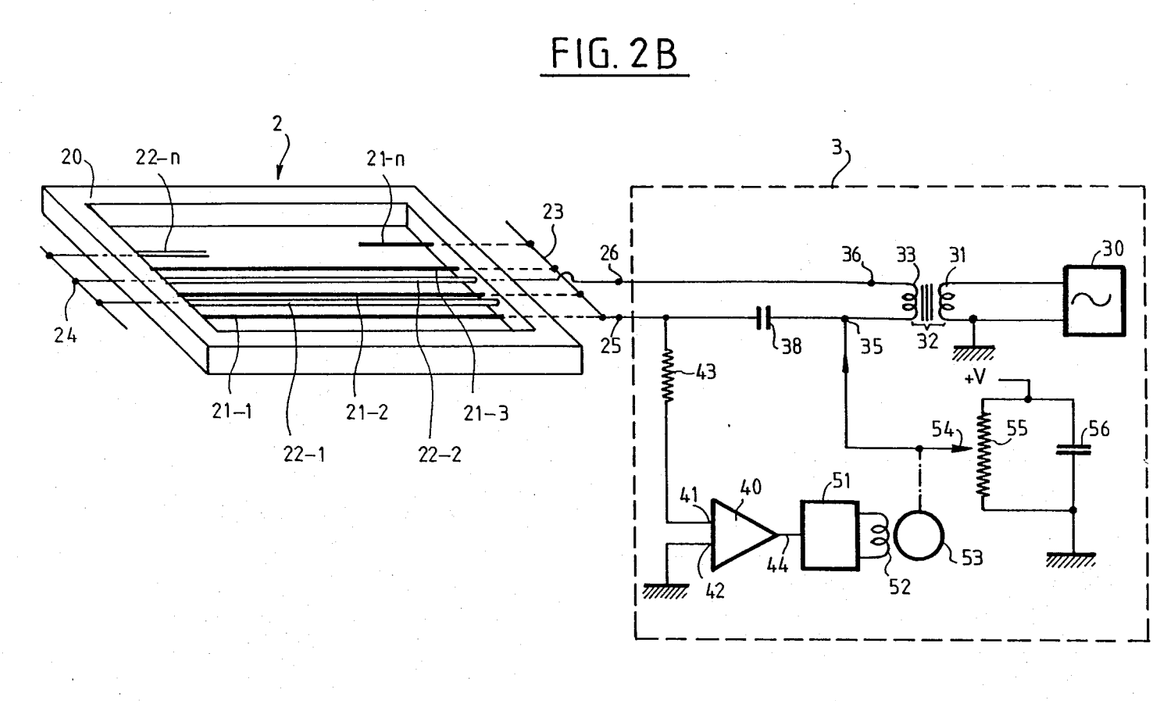
FIG. 2B shows a second embodiment of the invention in which the sensor is constituted by some of the wires.
Figure 2C:
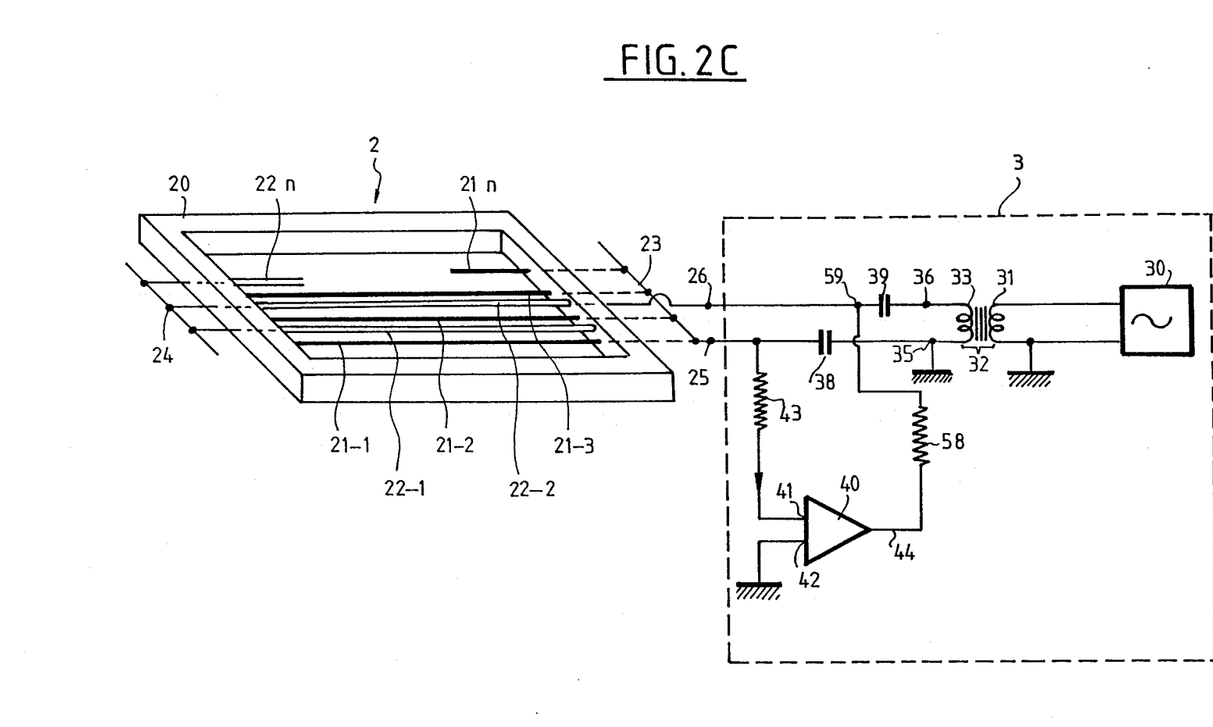
FIG. 2C shows a third embodiment of the invention in which the sensor is constituted by some of the wires.
Figure 3A:
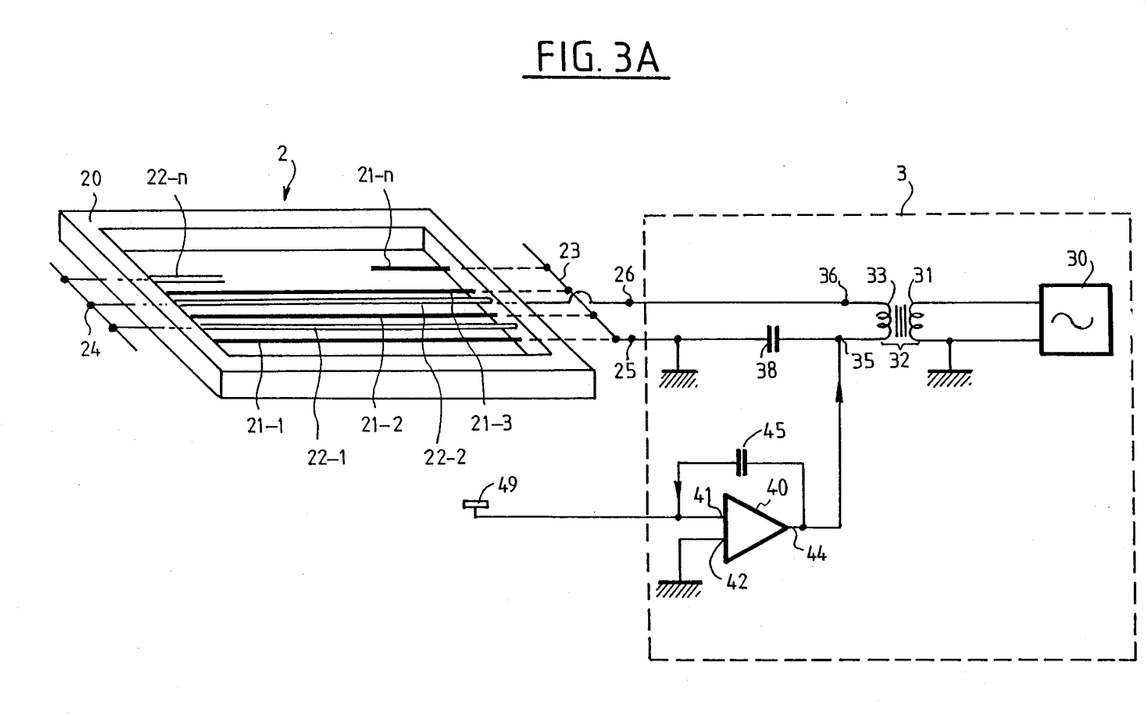
FIG. 3A shows a first embodiment of the invention in which the sensor is a separate electrode.
Figure 3B:
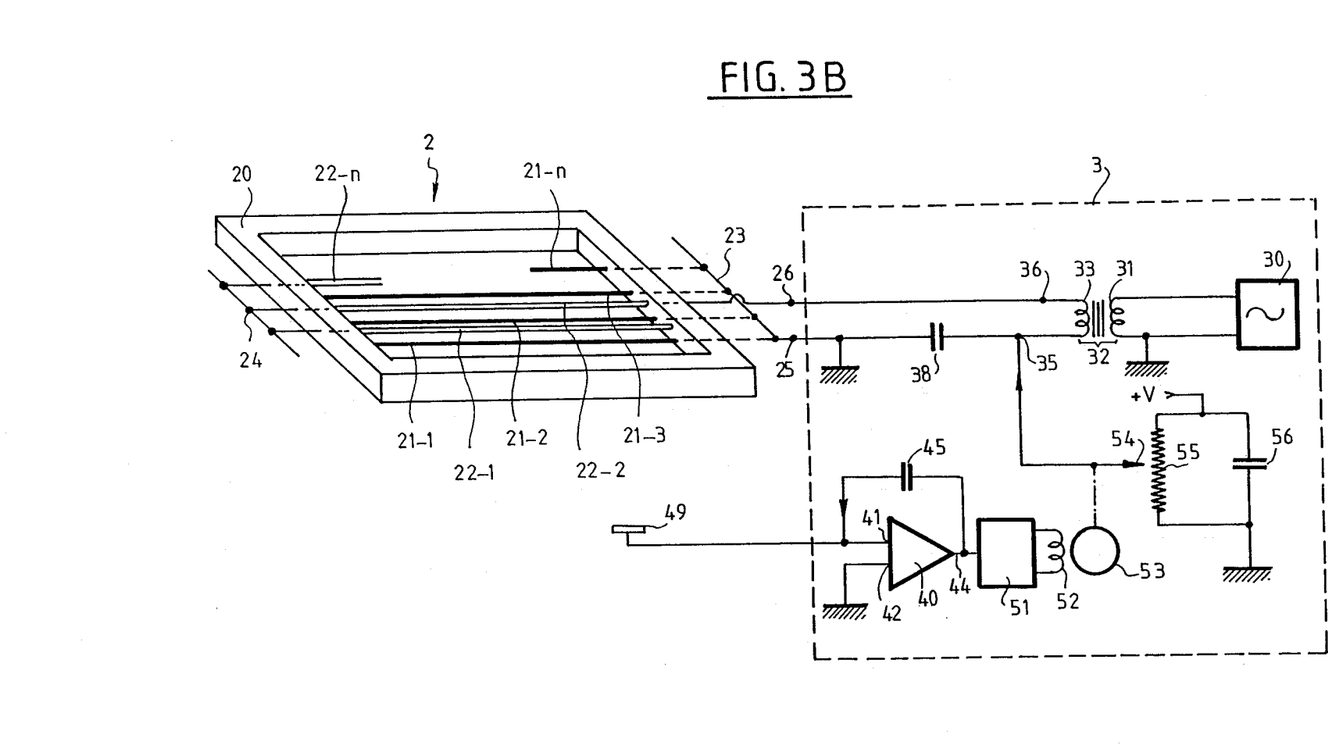
FIG. 3B shows a second embodiment of the invention in which the sensor is a separate electrode.
Figure 3C:
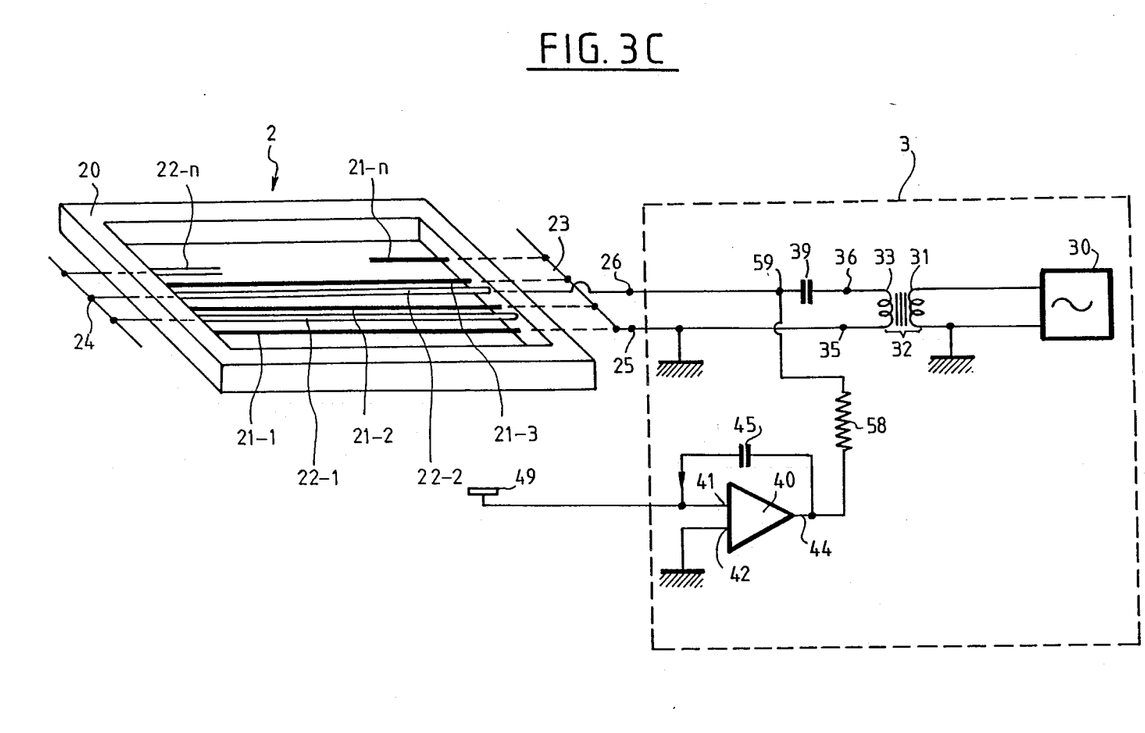
FIG. 3C shows a third embodiment of the invention in which the sensor is a separate electrode.

The terminal 36 may be connected to the terminal 26 either directly, or else via a capacitor 39 as shown in FIGS. 2C and 3C.

The general operation of a device in accordance with the invention is now described.

At the beginning of each half cycle of the AC power supply, the electric field in the vicinity of the bare wires 21 is due to the superposition of the field produced by the voltage now being applied and of the field from the charge accumulated on the dielectric sheaths of the adjacent insulated wires 22 during the preceding half-cycle. The total electric field thus has a high value and gives rise to ionization in the vicinity of the bare wire 21 under consideration. Charge having the same sign as the voltage on said wire will migrate towards the insulating sheaths.

This charge begins by neutralizing the residual charge and then accumulates, thereby greatly reducing the total field which settles at a value low enough for the main laminar air flow to entrain the majority of the ions produced into the cabinet below the hood.

This fundamental mechanism as observed by the Applicant explains why it is possible to obtain an electrostatic neutralizing effect at a considerable distance without requiring an auxiliary air flow.

Further, the frame 20 is placed in the ceiling of the cabinet beneath the air filter hood. As a result the main laminar flow passes therethrough without head loss and it entrains ions of both signs into the cabinet. The resulting disposition is therefore optimal from the aerodynamic point of view. It is practically impossible for an electric arc to appear because of the interposition of the dielectric sheaths on the insulated wires. In addition, ozone production is minimized by appropriately controlling the alternating feed voltage. The same goes for erosion on the bare wire, so that a negligible quantity of microparticles are torn from the system.

By using a frequency higher than 50 Hz, it is possible to reduce the charge imparted to residual dust in the main flow.

Finally, it may be observed that the disposition of the system in the hood, i.e. in the ceiling of the cabinet, takes it out of contact from the operator. In this respect, given that the device consumes little current, it is possible to interpose high value protective resistances in each bare wire.

On its own, the above-described device provides a satisfactory solution to the problem posed.

However, it is advantageous to associate certain improvements therewith in order to increase its effectiveness or its safety.

Figure 4:
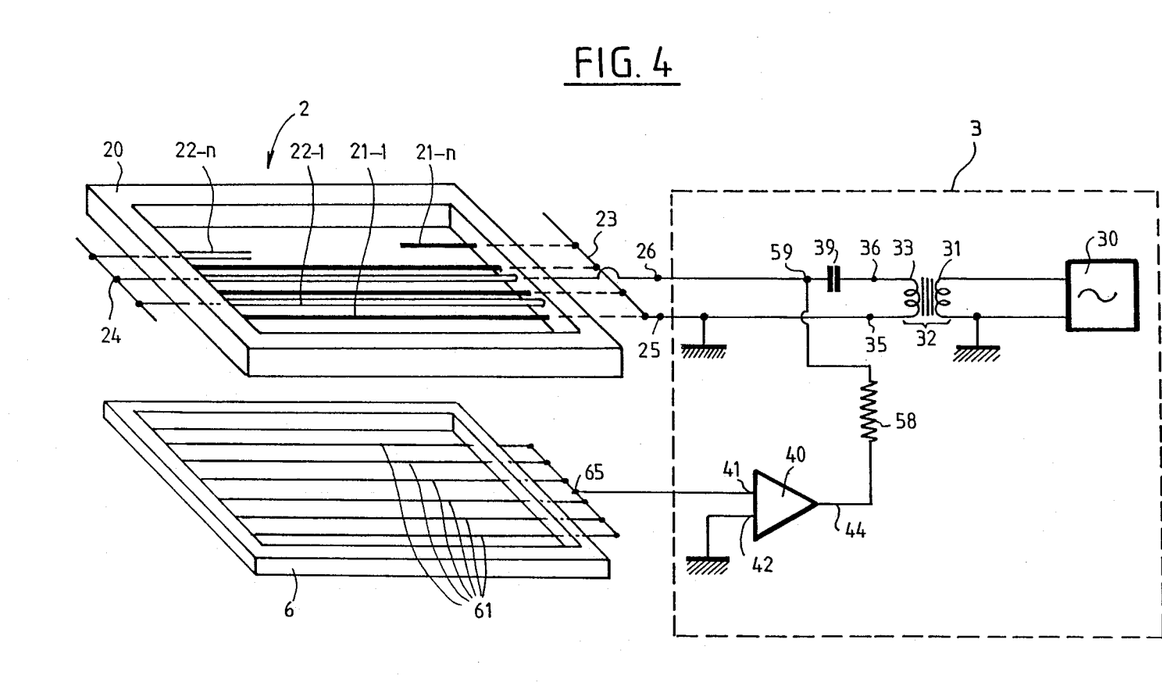
FIG. 4 shows another variant of the invention in which the potential sensor is constituted by an auxiliary grid frame, which embodiment is otherwise similar to those shown in FIGS. 2C or 3C.

Increasing effectiveness requires sensing of the value of the potential to be corrected. A potential sensor may be constituted either by the bare wires themselves (FIGS. 2A to 2C), or else by a separate electrode which is preferably placed in the vicinity of the work surface 15 (FIG. 1) as described below with reference to FIGS. 3A to 3C, or else on the auxiliary frame 6 (FIG. 4).

In FIGS. 2A to 2C, the terminal 25 connected to the bare wires 21 is also connected via a resistance 43 to one of the inputs 41 of a differential amplifier 40 which has high input impedance and is capable of passing DC, with its other input 42 being grounded.

In FIG. 2A, the output 44 from the amplifier is directly connected to terminal 35. Briefly, the voltage amplifier measures the potential of the bare wires and maintains it at value zero by acting on the potential applied to the core of the insulated wire by means of a series connection via the secondary winding 33 of the transformer 32 and the direct connection between terminals 36 and 26.

In the variant shown in FIG. 2B, the same result is obtained by connecting the output 44 of the amplifier 40 to a circuit 51 for controlling the stator winding 52 of a motor 53. The motor displaces the cursor 54 of a potentiometer 55. The potentiometer is connected between a tension +V and ground, and is in parallel with a capacitor 56. As a result a very accurately determined potential is applied to the insulated wires 22.

In another variant (FIG. 2C) a capacitor 39 is interposed between the terminals 26 and 36. The output 44 of the amplifier 40 is applied in parallel with the alternating voltage via a resistance 58 and a terminal 59 on that side of the capacitor 39 which is connected to the terminal 26.

The amplifier 40 has very high input impedance, so the leakage represented by this amplifier has no effect on the DC flowing in the bare wires 21 since the return path for this DC is still effectively open circuit.

The circuits of FIGS. 2A to 2C have the advantage of protecting the operator against accidental contact with the bare wires since the servocontrol system serves to keep the potential of the bare wires at value zero.

Even better protection can be obtained with the embodiments of FIGS. 3A to 3C. Each of these corresponds to a respective one of FIGS. 2A to 2C. The difference lies simply in that a separate electrode 49 placed level with the work surface 15 serves to sense the potential to be regulated and the terminal 25 connects the bare wires directly to ground.

In this case, the DC return path is no longer open circuit and consequently the positive and negative ion currents injected into the cabinet are no longer necessarily equal by construction; however, they are held equal by virtue of the above-described servocontrol system countering the effect of unequal ion currents, i.e. it prevents the potential of the electrode 49 from increasing.

This arrangement further improves the safety of operating personnel since by construction the bare wires are connected to ground.

It provides another advantage which is to eliminate irregularities in electrical potential inside laminar flow cabinets. In practice the volume of such cabinets is not accurately equipotential. Experience shows that even if the injected DC is exactly zero, the forces exerted on free charges by residual electric fields within the cabinet are capable of putting a potential of several tens of volts onto an isolated electrode. The disposition of FIGS. 3A to 3C gives the appropriate DC potential to the insulated wires in order to eliminate this parasitic effect on the work surface.

Still because of the non-equipotential nature of the volume of the cabinet, it is advantageous, at least in some applications, to place a frame 6 (FIG. 1) immediately downstream from the static electricity eliminator 2. This second frame 6 has a very wide mesh grid of grounded conductors stretched thereover. As a result, a strictly equipotential compartment extends between the frame 6 and the work surface 15.

Naturally, this embodiment with an additional frame 6 may be used in the absence of the servocontrol means described in FIGS 2A to 3C (in any of the variants thereof).

FIG. 4 shows a fourth embodiment similar to that of FIGS. 2C and 3C but in which the potential sensor is defined by the grid of wires 61 of the auxiliary frame 6.

In this variant, the common point 65 of the wires 61 is connected to the input 41 of the amplifier 40 whose output is applied via the resistance 58 to the point 59 situated between the capacitor 39 and the common point 26 of the insulated wires.

In addition, the bare wires 21 are grounded, at 35 for example, it being observed that the capacitor 38 is omitted. This other modification is applicable to FIGS. 2C and 3C.

Experience shows that the FIG. 4 embodiment combines the advantages of embodiments shown in FIGS. 2A to 3C.

Naturally, the FIG. 4 embodiment could be implemented as described with reference to FIGS. 2A and 3A or 2B and 3B.

Figure 5:
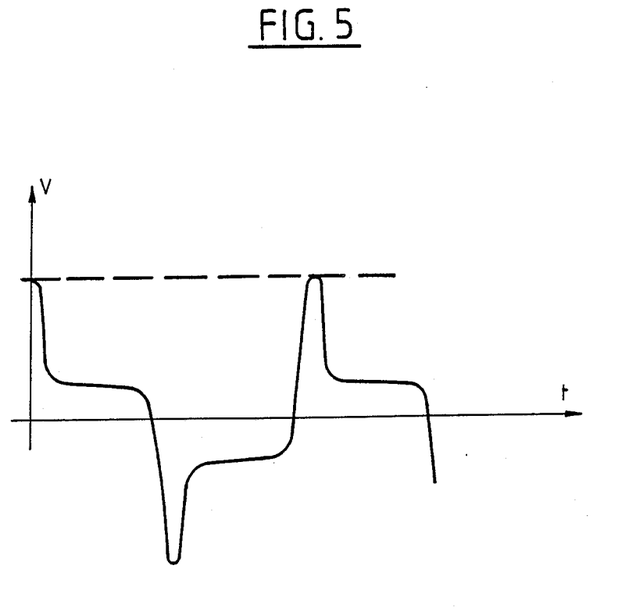
FIG. 5 is a waveform diagram showing the alternating voltage suitable for implementing the invention.

Reference is now made to FIG. 5 which shows an excitation waveform (output from the power supply 3, or more exactly from its transformer 32), and this waveform comprises initial high value pulses followed by a step at a much lower level throughout the remainder of each half cycle. As mentioned above, such a waveform can be obtained by having the transformer 32 as a saturated iron type transformer.

It has been observed that the initial pulse of each half cycle creates a sheath of plasma around each bare wire. The electric field which exists during the remainder of each half cycle is sufficiently small for the ions created at the beginning of the cycle to be entrained by the laminar air flow towards the work surface.

This disposition reinforces the benefits obtained by the dielectric sheathing the insulated wires 22 as described above. However, it may also be employed in a configuration using nothing but bare wires if it is desired solely to increase the range of the static electricity neutralization.

We claim:

1. A laminar flow hood type assembly, comprising:
    a cabinet defining a work surface in a compartment which is accessible from one side and which is provided in a top portion thereof with hood means for producing a laminar flow of filtered gas directed towards the work surface so that materials placed on the work surface are protected from the influence of the ambient atmosphere, a static electricity eliminator device interposed in the gas flow inlet in the top of the cabinet, said device comprising:

a rigid frame which is insulating or which includes insulators for supporting wires;

a first set of parallel conductive wires which are coplanar, equidistant and stretched over the rigid frame;

a second set of parallel conductive wires which are coplanar, equidistant and stretched over the rigid frame, and each of which is at substantially equal distances between two wires of the first set;

high tension insulating means interposed along and within each air gap between a wire of the first set and a wire of the second set, said insulating means comprising one of (i) a plurality of insulating blades interposed between said wires of said first set and said wires of said second set and (ii) a plurality of insulating sheaths disposed around said wires of said first set or said wires of said second set; and an alternating high tension power supply, in particular having an output transformer having opposite polarity output terminals connected respectively to feed the wires of the first set and the wires of the second set;

said high tension power supply comprising means for generating an alternating corona discharge in each gap between the wires of the second set, thereby producing flows of charges of both polarities which accompany the laminar flow of gas and serve to eliminate static electricity cabinet.

2. An assembly according to claim 1, wherein the high tension power supply generates an alternating high tension having a peak amplitude between 4 kilovolts and 10 kilovolts and a frequency between 50 Hz and 1000 Hz.

3. An assembly according to claim 1, wherein the high tension power supply generates an alternating high tension having a waveform which, in each half cycle, comprises an initial high value pulse followed by a low value step for the remainder of the half cycle.

4. An assembly according to claim 3, wherein the output from the alternating high tension power supply is provided by a saturated iron transformer.

5. An assembly according to claim 1, wherein said insulating sheaths are disposed around the wires of the second set along their portions stretched across the frame.

6. An assembly according to claim 5, further including a differential voltage amplifier having high input impedance and passing DC, with a first input thereof being connected to a potential sensor situated inside the assembly, and with the other input thereof being connected to ground, and with its output providing a DC correction voltage which is superposed on the output of the alternating high tension power supply.

7. An assembly according to claim 6, wherein the output of the amplifier is directly connected to the alternating high tension power supply via that one of the terminals of the transformer which is connected to the wires of the first set via a terminal, and with a capacitor being interposed between said transformer terminal and the terminal of the wires of the first set.

8. An assembly according to claim 6, wherein the output of the amplifier controls the cursor of a direct tension divider, said cursor being connected to that one of the terminals of the transformer which is connected to the wires of the first set via a terminal, a capacitor being interposed between said transformer terminal and the terminal of the wires of the first set.

9. An assembly according to claim 6, wherein that one of the output terminals of the high tension power supply which is connected to the wires of the second set is connected via a second capacitor, and wherein the output of the amplifier is connected via a resistance to that terminal of said second capacitor which is connected to the wires of the second set.

10. An assembly according to claim 9, wherein that one of the terminals of the high tension power supply which is connected to the wires of the first set via a terminal is connected thereto directly.

11. An assembly to claim 6, wherein the potential sensor is constituted by the wires of the first set.

12. An assembly according to claim 6, wherein the potential sensor is constituted by an auxiliary electrode, placed on the work surface of the cabinet, and the wires of the first set are connected to ground.

13. An assembly according to claim 12, further comprising a capacitor between the output and the first input of the amplifier.

14. An assembly according to claim 1, wherein a second frame is provided in the immediate downstream vicinity of the static electricity eliminator device, with a very wide mesh grid being stretched over said second frame to constitute an equipotential plane, which is connected to ground.

15. An assembly according to claim 6, wherein a second frame is provided in the immediate downstream vicinity of the static electricity eliminator device, with a very wide mesh grid being stretched over said second frame to constitute an equipotential plane and wherein the potential sensor is constituted by the grid of the second frame.

16. An assembly according to claim 1, wherein the wires of the first set include, on those portions thereof which are stretched over the frame, short and mutually parallel transverse wires constituting points on either side of the wires in order to localize discharge.

17. An assembly according to claim 1, wherein the wires of the first set have longitudinally extending sharp edges thereon of the type used in industrial precipitators.

18. An assembly according to claim 1, wherein said insulating means (i) isolates said wires of said first set and said wires of said second set from each other, (ii) enhances an ionizing field in a first phase of each half-cycle of said corona discharge and (iii) reduces the field attraction between said wires of said first set and said wires of said second set during a second phase of each half period of said corona discharge.

* * * * *